(No Model.)
A. GRUNER.
TELEGRAPH RELAY.
No. 539,512. Patented May 21, 1895.
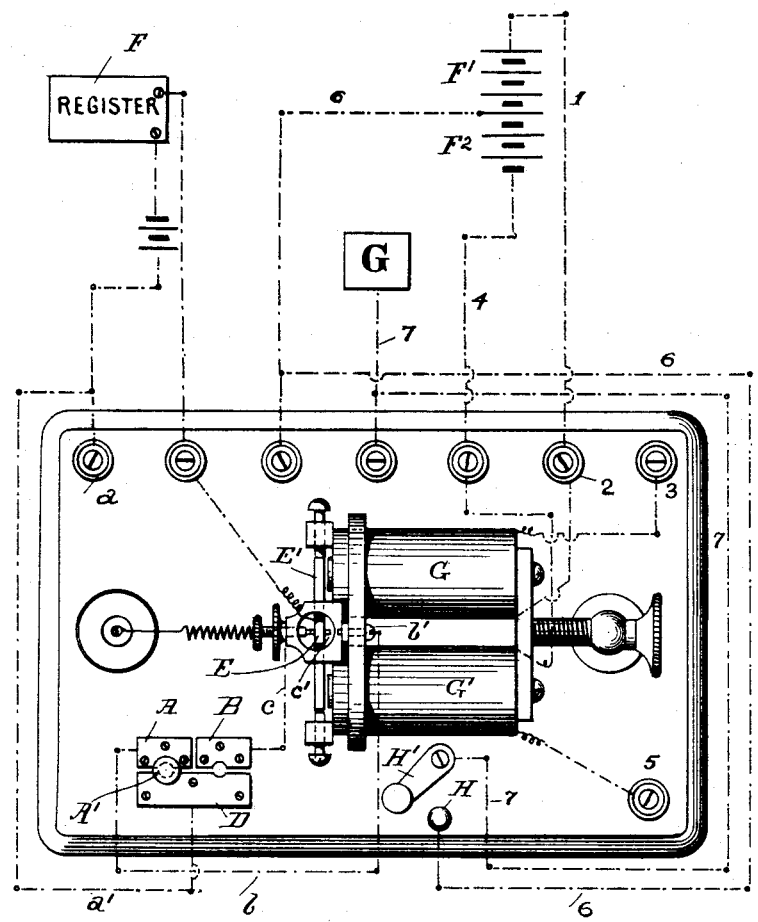
Witnesses:
F. Monteverde.
M. G. Loefler.
Inventor.
Alois Gruner
by W. A. Acker
Atty

UNITED STATES PATENT OFFICE.

ALOIS GRUNER, OF SAN FRANCISCO, CALIFORNIA.

TELEGRAPH-RELAY.

SPECIFICATION forming part of Letters Patent No. 539,512, dated May 21, 1895.

Application filed July 28, 1894. Serial No. 518,872. (No model.)

*To all whom it may concern:*

Be it known that I, ALOIS GRUNER, a citizen of the United States, residing at San Francisco, in the county of San Francisco and State of California, have invented certain new and useful Improvements in Telegraph-Relays; and I do hereby declare the following to be a full, clear, and exact description of said invention, such as will enable others skilled in the art to which it most nearly appertains to make, use, and practice the same.

This invention relates to an improved telegraph relay, designed for use in connection with an open or closed circuit, and the essential feature thereof consists in so connecting the coils that the battery for actuating the circuit will be located therebetween, instead of to one side thereof, and connected to the ends of both coils, the opposite ends being connected to the telegraphic or signal circuit. This arrangement of the coils, or dividing of the battery, is for the purpose of creating two distinct circuits, that is to say, permitting each coil to act for itself independent of the other, in order that the relay will not be entirely useless in case of a break occurring in one circuit, but will still operate through the other circuit, as will be hereinafter more fully set forth and described.

In order to carry out my invention the main battery is divided by a connecting wire leading to a terminal on the relay, which is connected with a point or plate so as to permit of the same being switched on or off as desired, under the conditions hereinafter expressed. The switch used for this purpose is connected to a wire which extends by either ground or otherwise to some point on the main line.

The relay is provided with two or more repeating points governed by means of a suitable switch, which in the accompanying diagrammatic drawing is shown or represented by plates A, B. The plate D, which is connected to either plate A or B, by means of a plug A', is connected by wire $a'$ to a terminal $a$, which leads to one pole of a local battery and connects with the lever E, which carries an armature E'. By means of wire $b$, the plate A is connected to repeating point $b'$, the one nearest the electro-magnet, which is in contact with lever E when armature E', is attracted by the magnet. The plate B is connected, by wire $c$, to repeating point $c'$, which is in contact with the lever E, when no current is passing around the magnets and the armature E', is consequently away from the poles. By this arrangement the relay can be used on either a closed or open circuit by changing the plug or switch A', so as to connect armature carrying lever with either A or B.

Suppose the main signal circuit is on a closed circuit system, that is, in its normal condition and at rest, the electro-magnets will hold the armature E', against the poles and cause lever E, to contact with repeating point nearest the poles of the magnets, which point connects with plate A. The plug or switch connects the plate B, with plate D. If a signal be transmitted while the relay is connected as described, it will cause the lever to contact, at each break of the circuit, with repeating point $c'$, which connects with B, and so translate by the local circuit.

Should at any time, during the working of the relay, the main line circuit become interrupted in any manner whatsoever—say for instance by becoming broken, and both ends of the break remain clear of the ground, then the armature will fall away from the magnets and the register F, in the usual manner, will indicate that the circuit is broken or open.

The main battery is connected to the magnet coils by two distinct or independent circuits, each circuit leading from an opposite side of the battery. For the purpose of more fully understanding this feature of the device, I will refer to the battery as being divided. From the section or half F', of the battery runs the wire 1, which passes around the binding post 2, enters the magnet section G at one side, is wound therein and passes from the opposite side of the magnet section and from post 3, to the main circuit. The section or half F², of the battery is connected to the magnet section G', by wire 4, which enters at one side thereof, is wound therein and passes from the opposite side thereof and from post 5, to the main line circuit. It will thus be seen that each section of the magnet is controlled by independent circuits, each of which is operated by one half of the main battery.

The battery is divided by the wire 6, which leads to a terminal point H, connected to a ground wire 7, by the switch H'.

In case the main line circuit becomes broken, under the conditions before described, by changing the plug A', from B to A, then D and A will become operative when the main circuit is established or closed. The switch H', being turned on stud or point H, the main battery will be divided as it is through two distinct circuits, the point of break in main line circuit being one terminal, and H', being connected with a conductor either by ground or otherwise with the main circuit, the other terminal. Thus each side of the relay magnet acts for its own circuit. As long as no current flows through the coils, the cores remain neutral. However, in case signals are transmitted on one side of the coils, the other core, in view of the fact that no current would flow through both, except also a signal be sent on that side, will by virtue of induction become also magnetic and the armature lever will respond promptly to signals.

Supposing the main circuit breaks and in so doing one or both ends connect with the ground, instead of remaining clear. Then this fact will readily become known, as by changing the plug A' from B to A, and switch H', to point H, the repeating points will stand D with A. The switch H', is then turned off of point H, when the unknown ground will be the terminal.

By the relay, as the main battery is divided on both circuits, it will be seen that the negative and positive go to line respectively. Consequently in searching for a break or trouble, the same can readily be located by simply attaching, for instance, a small galvanoscope and by indicated polarity the searcher will know if he is near or beyond the trouble.

Having thus described my invention, what I claim as new, and desire to secure protection in by Letters Patent, is—

In a relay, the combination with a magnet having independently operated coils, of a battery, independent wires leading from the battery to the respective coils and from the coils to a main circuit, a supplemental dividing wire leading from the battery and forming an auxiliary intermediate circuit through the ground or otherwise, and a switch in said ground circuit, substantially as described.

In testimony whereof I affix my signature in presence of two witnesses.

ALOIS GRUNER.

Witnesses:
   W. A. ACKER,
   LEE D. CRAIG.